UNITED STATES PATENT OFFICE.

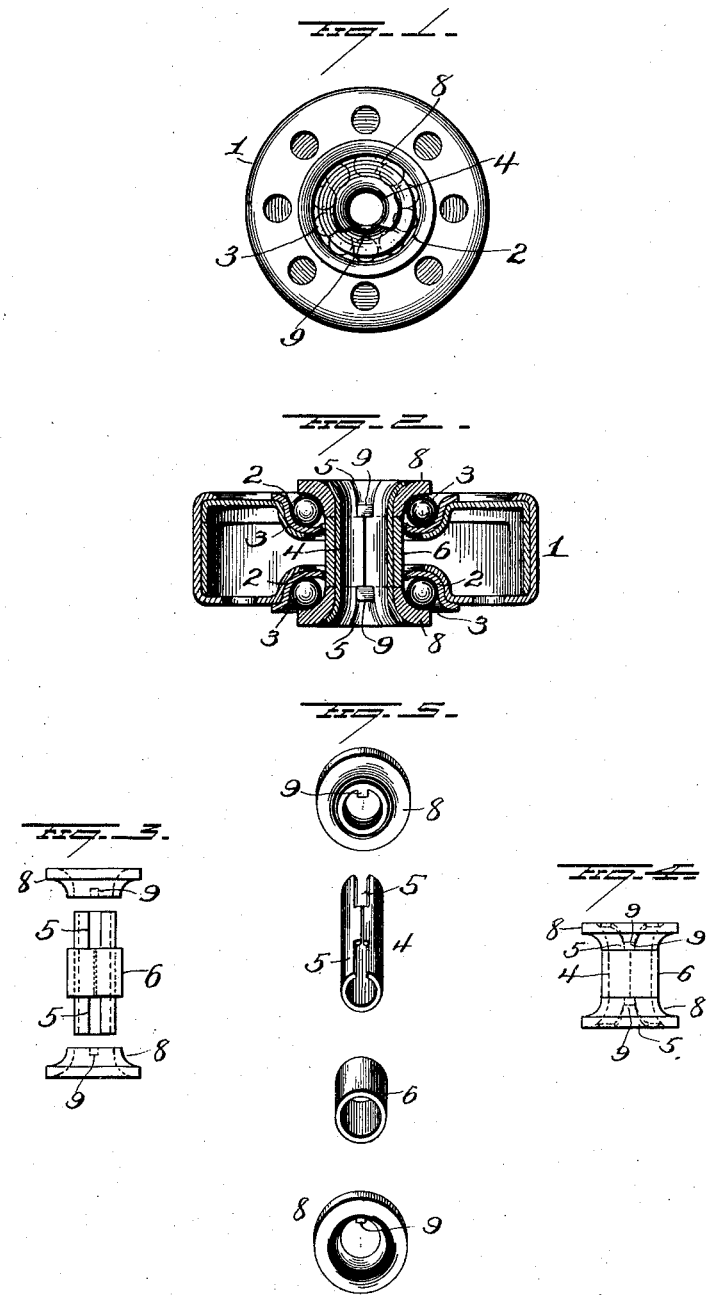

THOMAS W. BRYANT AND CHRISTIAN G. HOERLE, OF TORRINGTON, CONNECTICUT.

ROLLER-BEARING.

1,330,579.  Specification of Letters Patent.  Patented Feb. 10, 1920.

Application filed April 3, 1919. Serial No. 287,136.

*To all whom it may concern:*

Be it known that we, THOMAS W. BRYANT and CHRISTIAN G. HOERLE, of Torrington, in the county of Litchfield and State of Connecticut, have invented certain new and useful Improvements in Roller - Bearings; and we do hereby declare the following to be a full, clear, and exact description of the invention, such as will enable others skilled in the art to which it appertains to make and use the same.

Our invention relates to improvements in roller bearings designed more particularly for skate wheels, the object being to provide a construction wherein the rollers and their bearings are assembled and permanently secured within the wheel, so that the wheel and its self contained bearing constitute a unitary structure which may be readily applied and removed intact.

With this object in view our invention consists in a wheel having a ball race way; a sleeve located within the wheel and passing centrally through said race way; two cones independent of the sleeve but secured to the same at the ends of the latter and balls within the wheel and held therein by the cones.

It further consists in a wheel having ball race ways, a sleeve within the wheel and concentric with the race ways; a separator on the sleeve; two cones secured on the ends of the sleeve, each cone having a tongue resting within a slot in the sleeve and balls between said cones and the race ways in the wheel.

Our invention further consists in the details of construction as will be more fully explained and pointed out in the claims.

In the accompanying drawings, Figure 1 is a view in elevation of a roller skate wheel embodying our invention; Fig. 2 is a view in transverse section of the same; Fig. 3 is a view of the sleeve with the spacer thereon and the cones removed; Fig. 4 is a view of the same with the cones on the sleeve and Fig. 5 is a view of these parts separated.

1 represents a roller skate wheel, sheave or similar device having a central bore or hub within which is secured or formed the hardened bearings or cups 2 forming race ways for the balls 3. The openings through the cups and center of the wheel are of a size sufficient to receive the sleeve 4 which is slightly longer than the wheel is wide. This sleeve is hollow and is preferably made of sheet steel bent into tubular form, and provided at its ends with slots 5 which terminate short of the center of the sleeve. Instead however of making the sleeve of sheet steel it may be made of tubing or a drilled rod slotted as shown.

Secured on the sleeve is the spacer 6. This spacer is a short hollow tube secured centrally to the outer face of the sleeve by friction, and adapted to form spacers for the cones 8 which are secured to the ends of the sleeve 4 and form the outer members of the ball race ways and also form the closures for the hub of the wheel. Each cone is provided with a tongue 9 adapted to enter a slot 5 in the sleeve for preventing the cones from turning, and the latter are held in place preferably by expanding or upsetting the outer ends of the sleeve against the outer face of the cones thus permanently locking the sleeve, cones and balls to the wheel.

It may be desirable to dispense with the spacer 6, and if the latter be not used the tongues 9 on the cones 8 will abut against the closed ends of the slots in the sleeve and be limited in their movements by the latter. Again we may weld the cones to the sleeve and when this method of securing the parts is employed, the tongues and grooves may be dispensed with, as the welding would prevent the cones from turning on the sleeve. When the parts are assembled, the balls, sleeve and cones constitute an integral part of the wheel which is then ready for attachment to the shaft, spindle or axle with which it is designed for use.

In assembling the parts, the hardened cups or bearings are first applied to the wheel and a cone 8 permanently or temporarily secured on one end of the sleeve, the spacer 6 being applied to the sleeve either before or after the attachment of the first cone thereto. After the cone and spacer have been attached and the balls placed in one race way in the cup or bearing in the wheel, the free end of the sleeve is passed through the hub of the wheel thus bringing the cone on the sleeve against the balls in the wheel and confining the latter in place. After the parts have been thus assembled, the wheel is turned to bring the empty cone or bearing therein uppermost and the cup filled with the balls after which the second cone is placed on the end of the sleeve and both cones are then secured permanently to the sleeve by expanding or upsetting the ends of the latter against the outer face of the cones, or by welding or otherwise permanently securing them to the sleeve as the case may be. The sleeve, cones and balls then become an integral part of the wheel which is ready for immediate attachment to the skate or other machine or device with which it is designed to be used.

By slotting the sleeves at the ends only, the closed ends of the slots may form the abutments for the tongues on the cones and act as spacers for the latter, thus limiting their inward movements in assembling and preventing them from binding against the balls. When the spacing sleeve is employed, it also positively limits the positions of the cones and holds them in proper relation to the anti-friction balls. The sleeve of the wheel is adapted to receive a spindle or axle secured to a skate or other article and is secured thereon by a nut.

Having fully described our invention what we claim as new and desire to secure by Letters-Patent, is:—

1. As a new article of manufacture, a wheel having a central opening and raceways for balls therein, balls in said raceways, a sleeve within said opening, two separated cones forming the outer bearings for the balls, the said cones being rigidly secured to the sleeve, and means for holding the cones separated and in fixed relation to each other and to the sleeve.

2. As a new article of manufacture, a wheel having a central opening and raceways for balls therein, balls in said raceways, a sleeve within said opening, a spacer on said sleeve and cones made separate from the sleeve but rigidly secured to the latter, the said cones forming the outer bearings for the balls.

3. As a new article of manufacture a wheel having a central opening and raceways for balls therein, balls in said raceway, a sleeve within said opening and provided with open slots at its ends and cones secured on the ends of the sleeve, each cone having a tongue to enter a slot in the sleeve.

4. As a new article of manufacture, a wheel having a central opening, a raceway for balls therein, balls in said raceway, a sleeve within said opening and provided at each end with an open slot, a spacer on the sleeve intermediate the slots and cones secured to the ends of the sleeve and bearing against said spacer, the said cones forming the outer bearings for the balls.

5. As a new article of manufacture a wheel having a central opening, a raceway for balls therein, balls in said raceway, a sleeve having slots at its ends, a spacer on said sleeve, and cones mounted on the ends of the sleeve and forming the outer bearings for the balls, each cone having a tongue resting in a slot in the sleeve and both secured to the sleeve by expanding the ends of the latter.

In testimony whereof we have signed this specification in the presence of two subscribing witnesses.

THOMAS W. BRYANT.
CHRISTIAN G. HOERL.

Witnesses:
FRANK J. DAMON,
A. W. BRIGHT.